US009998711B2

(12) United States Patent
Safaei et al.

(10) Patent No.: US 9,998,711 B2
(45) Date of Patent: Jun. 12, 2018

(54) REDUCING DATA CONTENT ON A DATA SYSTEM

(71) Applicant: iSee VC Pty Ltd, The Rocks, New South Wales (AU)

(72) Inventors: Farzad Safaei, The Rocks (AU); Pedram Pourashraf, The Rocks (AU)

(73) Assignee: iSee VC Pty Ltd, The Rocks, New South Wales (AU)

( * ) Notice: Subject to any disclaimer, the term of this patent is extended or adjusted under 35 U.S.C. 154(b) by 0 days. days.

(21) Appl. No.: 15/522,096

(22) PCT Filed: Nov. 11, 2015

(86) PCT No.: PCT/AU2015/000692
§ 371 (c)(1),
(2) Date: Apr. 26, 2017

(87) PCT Pub. No.: WO2016/074024
PCT Pub. Date: May 19, 2016

(65) Prior Publication Data
US 2017/0318262 A1   Nov. 2, 2017

(30) Foreign Application Priority Data
Nov. 11, 2014   (AU) ................. 2014904527

(51) Int. Cl.
*H04N 7/14*   (2006.01)
*H04N 7/15*   (2006.01)
(Continued)

(52) U.S. Cl.
CPC ......... *H04N 7/157* (2013.01); *H04L 12/1827* (2013.01); *H04L 65/403* (2013.01); *H04N 7/0117* (2013.01); *H04N 7/0127* (2013.01)

(58) Field of Classification Search
USPC ............................... 348/14.01, 14.08, 14.12
See application file for complete search history.

(56) References Cited

U.S. PATENT DOCUMENTS 6,496,217 B1 * 12/2002 Piotrowski ..... H04N 21/234318
                                                    348/14.08
8,144,187 B2 *  3/2012 Moore ................... H04N 7/152
                                                    348/14.09
(Continued)

OTHER PUBLICATIONS

International Search Report dated Feb. 23, 2016 in International Application No. PCT/AU2015/000692, filed Nov. 11, 2015, in 3 pages.

(Continued)

*Primary Examiner* — Quoc D Tran
(74) *Attorney, Agent, or Firm* — Knobbe, Martens, Olson & Bear, LLP

(57) ABSTRACT

An apparatus for controlling the representation of at least one data stream in a multi-participant application, comprising a server and a client, comprising: transmitter for transmitting a plurality of data streams from a server to a client across a communications network, each data stream being associated with a participant in a multi-participant video application; processor for determining a data stream ranking associated with at least one of the plurality of data streams; and, processor for selectively controlling the representation of at least one of the plurality of the data streams at the client in dependence on the data stream ranking.

16 Claims, 14 Drawing Sheets

(51) Int. Cl.
*H04L 29/06* (2006.01)
*H04N 7/01* (2006.01)
*H04L 12/18* (2006.01)

(56) References Cited

U.S. PATENT DOCUMENTS

| | | | |
|---|---|---|---|
| 8,400,491 B1* | 3/2013 | Panpaliya | H04N 7/147 348/14.1 |
| 2009/0063983 A1 | 3/2009 | Amidon et al. | |
| 2013/0191479 A1* | 7/2013 | Gottlieb | H04N 7/15 709/206 |
| 2014/0267564 A1 | 9/2014 | Pourashraf et al. | |
| 2015/0373302 A1* | 12/2015 | Hui | H04N 7/147 348/14.12 |

OTHER PUBLICATIONS

Safaei et al., "Large-scale immersive video conferencing by altering video quality and distribution based on the virtual context," IEEE Communications Magazine, vol. 52, (8), pp. 66-72, 2014.

* cited by examiner

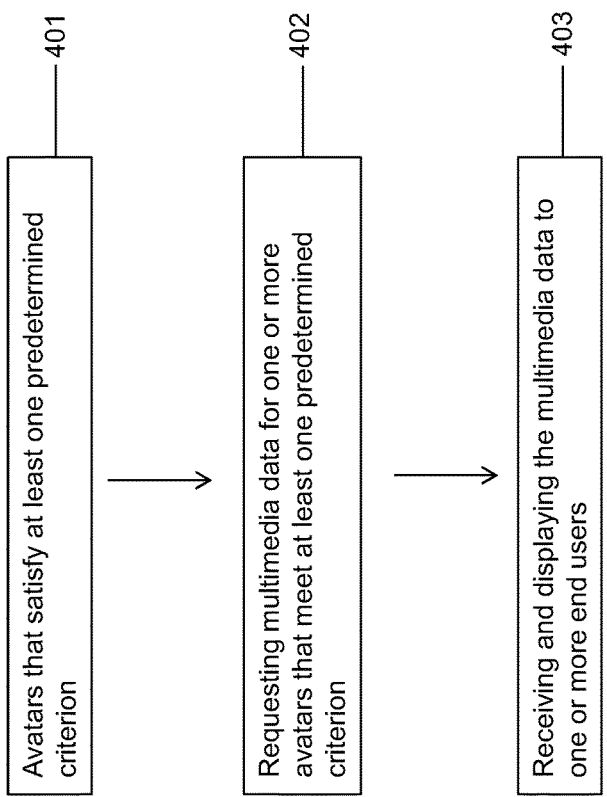

REDUCING DATA CONTENT ON A DATA SYSTEM

The present invention relates to a system and method for controlling the content of data streams.

INTRODUCTION

Multiparty video conferencing is on the rise. To scale a video conference to support a large number of participants, a variety of techniques may be used. The aim would be to present many videos to a given user in a way that is cognitively informative and does not overwhelm the user. One possible approach to achieve this objective is the concept of immersive video conferencing (IVC), which employs a virtual 3D environment in which the participants' videos are displayed on the front surface of their respective avatars. An IVC can also be presented on a 2D surface, provided the videos of other participants are appropriately presented at different scales and orientations to clarity and differentiate participants based on a subjective measure and help with scalability. FIG. 1 below shows possible arrangement of participants in 3D and 2D IVC.

IVC can potentially scale to a larger number of participants. In our prior patents, we proposed two main mechanisms for this purpose: (i) area of interest (AOI) management, which enables the client to only download the subset of videos that are relevant to this client at this stage; and (ii) perceptual pruning method that will reduce the spatial and temporal resolution of video depending on the size and orientation of videos as presented to the client.

However, other mechanisms are required to cope with a 'congested' situation where the required network capacity for transmission of the visible avatars' videos at the desired quality1 exceeds the actual available network capacity. Without a proper design, network limitations will result in a random packet loss from the multitude of video streams that are associated with the client's visual scene. If this loss is not properly controlled, it may affect many video streams randomly and unpredictably, resulting in significant loss to the quality of experience (QoE) of the user. Of course, if the network capacity is not sufficient, some loss in unavoidable. The aim of this proposal is to drop packets judiciously so that for a given bandwidth constraint, the least degradation in QoE is experienced. The key question, therefore, is the ranking of avatars' videos with respect to their 'saliency' or importance as perceived by the user, so that the degradation is applied to less salient content. Note that saliency is dependent on the personalised perspective of each client and hence the saliency ranking will be different for each client.

Virtual saliency ranking (VSR) is a mechanism, which determines the importance of the video content of avatars inside an IVC with respect to the viewer (local avatar). This process mimics the real-life behaviour of a human-being interacting with other humans in a crowded environment. When people mingle in a crowded environment, they give different levels of attention to the people in a cluster participating in a conversation. In other words, they rank people in a conversation based on their body languages such as their postures, orientations, distances, activities and etc. As a result, a human being with limited visual field and focal point can mingle in a crowd without missing essential information produced real-time around him/her. For example, in a cluster, the speaker usually receives the highest attention and if someone else starts to talk, the focus of the group gracefully shifts toward the new speaker.

To mimic this behaviour in IVC, virtual factors such as visibility state, distance and orientation with respect to the local client are calculated in real-time. In addition to the mentioned visual factors, avatars' voice activities and rendering frame rate2 are considered as well. Moreover, the network delay involved in sending the retrieved data to other clients in the distributed model is also taken into account by introducing a prediction factor. The combination of these factors is merged in a unified score that is then used by the system to rank the importance of various elements the aggregated bit rate.

SUMMARY OF THE INVENTION

In a first aspect the invention provides a method for controlling the representation of at least one data stream in a multi-participant application, comprising the steps of: transmitting a plurality of data streams from a server to a client across a communications network, each data stream being associated with a participant in a multi-participant video application; determining a data stream ranking associated with at least one of the plurality of data streams; and, selectively controlling the representation of at least one of the plurality of data streams in a client application in dependence on the data stream ranking.

In embodiments the data streams are associated with participants in a multi-participant application, wherein a first participant is associated with a first data stream and at least one further participant is associated with at least one further data stream.

In embodiments the step of transmitting comprises transmitting the at least one further data stream to a client associated with the first participant.

In embodiments the data streams include video data.

In embodiments the data streams include audio data.

In embodiments the representation of a data stream comprises a representation of the participant associated with the data stream rendered in a virtual environment, the representation being positioned spatially within the virtual environment.

In embodiments the data stream ranking of a data stream is dependent on at least one of the following factors:

the position of the representation in the virtual environment with respect to a virtual viewpoint;

the orientation of the representation in the virtual environment with respect to a virtual viewpoint;

the visibility of the representation in the virtual environment;

the prediction state of the representation in the virtual environment; and the audio activity of the representation in the virtual environment.

In embodiments the representation is an avatar.

In embodiments the factors include a weighting contribution.

Embodiments include the further step of receiving notification of data loss from at least one data stream over the communications network and wherein the step of controlling the representation of the data stream comprises selectively reducing data content on at least one data stream in dependence on the data stream ranking.

In embodiments the step of controlling the representation of the data stream controls the representation of the participant rendered in the virtual environment.

In embodiments the step of controlling the representation includes at least one of:

controlling the colour of the participant rendered in the virtual environment;

controlling the physical appearance of the participant rendered in the virtual environment;

controlling the audio level of the representation of the participant rendered in the virtual environment.

In embodiments the step of selectively reducing data content is performed to maintain the saliency of the representations in the virtual environment.

Embodiments, after a predetermined time period, selectively increase data content on at least one data stream.

In embodiments the data content is reduced by spatial reduction.

In embodiments the data content is reduced by reducing the frame rate of the data.

In embodiments the data content is reduced by reducing the bitrate of the video data.

Embodiments include the step of receiving notification of the data stream ranking at the server, wherein the step of reducing data content on at least one data stream is performed in response to receiving notification of the data stream ranking.

In a second aspect the invention provides an apparatus for controlling the representation of at least one data stream in a multi-participant application, comprising a server and a client, comprising:

transmitter for transmitting a plurality of data streams from a server to a client across a communications network, each data stream being associated with a participant in a multi-participant video application;

processor for determining a data stream ranking associated with at least one of the plurality of data streams;

receiver for receiving notification of a data stream ranking; and, processor for selectively controlling the representation of at least one of the plurality of the data streams at the client in dependence on the data stream ranking.

In a third aspect the invention provides a method for reducing data content on a data stream, comprising the steps of:

transmitting at least one data stream across a communications network;

associating a data stream ranking with the at least one data stream;

receiving notification of data loss from the at least one data stream over the communications network; and, selectively reducing data on at least one data stream in dependence on the data stream ranking.

In a fourth aspect the invention provides an apparatus for reducing data content on a data stream, comprising:

transmitter for transmitting at least one data stream across a communications network;

processor for associating a data stream ranking with the at least one data stream;

receiver for receiving notification of data loss from the at least one data stream over the communications network; and, processor for selectively reducing data on at least one data stream in dependence on the data stream ranking.

In a fifth aspect the invention provides a method for maintaining saliency between data streams in a multi data stream application, comprising the steps of:

receiving multiple data streams to be rendered in a multi-party application;

ranking the data streams at the client;

detecting data loss in at least one of the multiple data streams across the communications network;

notifying the detected data loss and the ranking of the data streams.

In a sixth aspect the invention provides a method for maintaining saliency between rendered data streams in a data limited network, comprising the steps of:

transmitting at least one data stream across a communications network each data stream being suitable for rendering and being associated with a participant in a multiparty application;

receiving a ranking associated with the at least one data stream, the ranking being associated with the significance of the participant in the multiparty application;

receiving notification of received data from at least one of the transmitted data stream on the communications network;

adapting data in at least one data stream in dependence on the ranking associated with the at least one data stream; and transmitting at least one adapted data stream.

In a seventh aspect the invention provides an apparatus for maintaining saliency between data streams in a multi data stream application, comprising:

receiver for receiving multiple data streams to be rendered in a multi-party application;

processor for ranking the data streams at the client;

detector for detecting data loss in at least one of the multiple data streams across the communications network;

transmitter for notifying the detected data loss and the ranking of the data streams.

In an eighth aspect the invention provides an apparatus for maintaining saliency between rendered data streams in a data limited network, comprising:

transmitter for transmitting at least one data stream across a communications network each data stream being suitable for rendering and being associated with a participant in a multiparty application;

receiver for receiving a ranking associated with the at least one data stream, the ranking being associated with the significance of the participant in the multiparty application;

receiving notification of received data from at least one of the transmitted data stream on the communications network;

processor for adapting data in at least one data stream in dependence on the ranking associated with the at least one data stream; and transmitter transmitting at least one adapted data stream.

In an ninth aspect the invention provides a method for maintaining saliency between data streams in a multi data stream application, comprising the steps of:

receiving multiple data streams to be rendered in a multi-party application;

ranking the data streams at a client; and;

controlling the representation of at least one of the multiple data streams in dependence on the ranking of the data streams.

BRIEF DESCRIPTION OF THE FIGURES

In order to achieve a better understanding of the nature of the present invention embodiments will now be described, by way of example only, with reference to the accompanying figures in which:

FIG. 4a is a flow chart that shows a general method of managing multimedia data in a virtual environment as implemented by a client.

DETAILED DESCRIPTION OF EMBODIMENTS OF THE INVENTION

Figure 1:
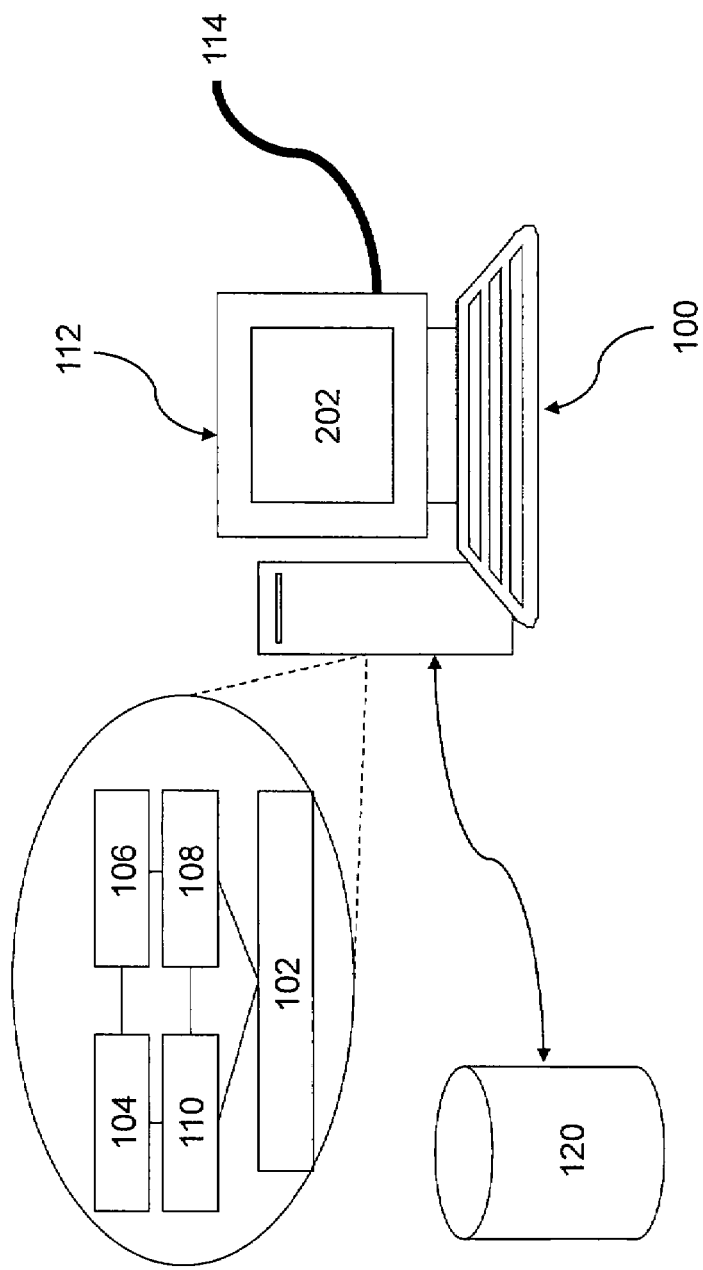
FIG. 1 is a schematic diagram of a general computing device upon which the system and method of the present invention may be implemented.

Referring to FIG. 1 there is a shown a schematic diagram of a general computing device 100. The computing device 100 comprises suitable components necessary to receive, store and execute appropriate computer instructions. The components may include a processing unit 102, read-only memory (ROM) 104, random access memory (RAM) 106, and input/output devices such as disk drives 108, input devices 110 such as an Ethernet port, a USB port, etc. Display 112 such as a liquid crystal display, a light emitting display or any other suitable display and communications links 114. The server 100 includes instructions that may be included in ROM 104, RAM 106 or disk drives 108 and may be executed by the processing unit 102. There may be provided a plurality of communication links 114 which may variously connect to one or more computing devices such as a server, personal computers, terminals, wireless or handheld computing devices. At least one of a plurality of communications link may be connected to an external computing network through a telephone line or other type of communications link.

The service may include storage devices such as a disk drive 108 which may encompass solid state drives, hard disk drives, optical drives or magnetic tape drives. The server 100 may use a single disk drive or multiple disk drives. The server 100 may also have a suitable operating system 116 which resides on the disk drive or in the ROM of the server 100.

The device may include a database 120 residing on a disk or other storage device which is arranged to store data. The database 120 is in communication with an interface 202, which is implemented by computer software residing on the computing device 100. The interface 202 provides a means by which to communicate with a human user. In the specification reference to servers, processors, clients, user devices or computing devices are implemented using a computing device 100 described earlier.

Figure 2:
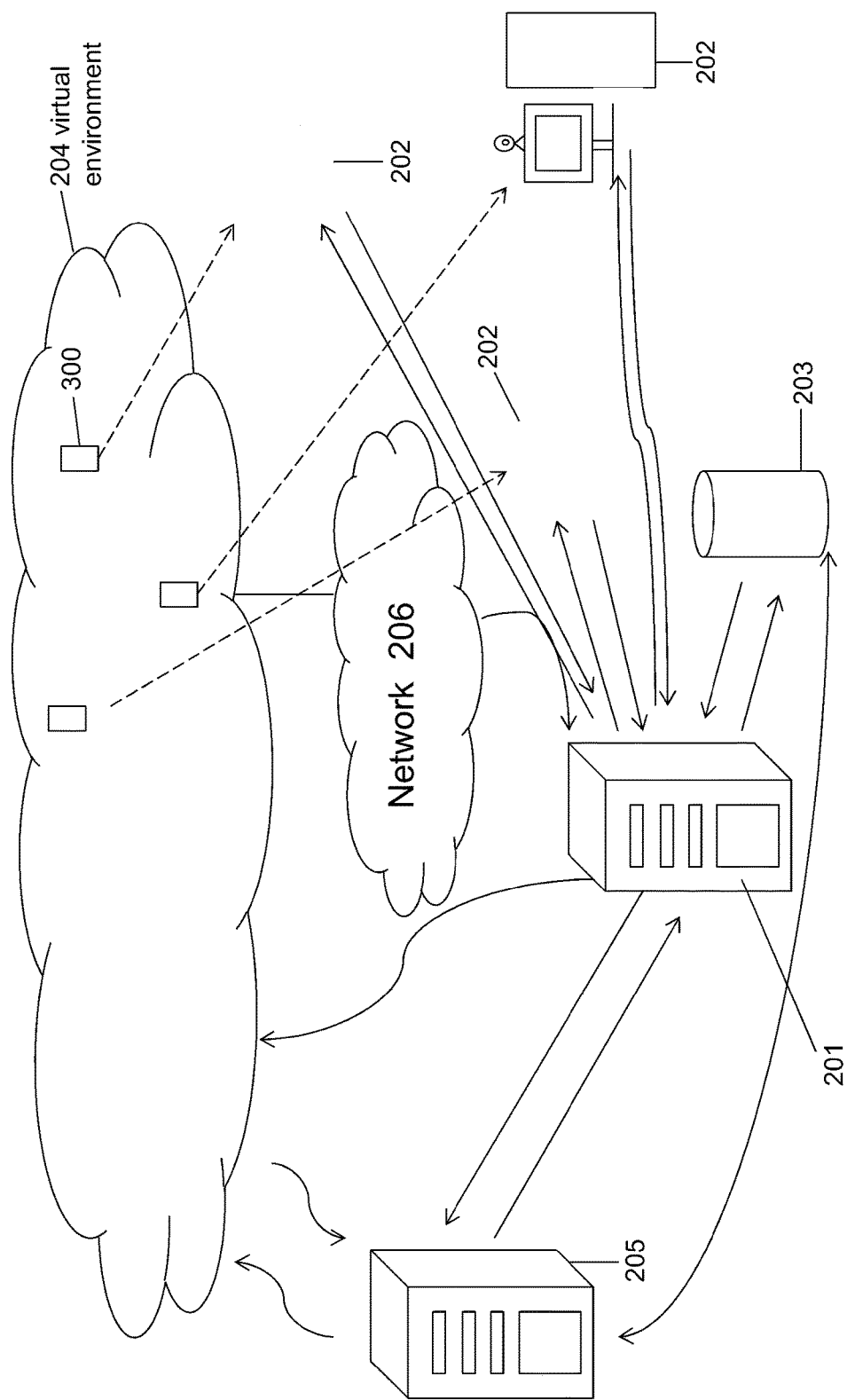
FIG. 2 is a schematic diagram of a system arranged for managing multimedia data in a virtual environment.

FIG. 2 shows a system diagram of a system for managing multimedia data. The system 200 includes a central server 201, at least one or more clients 202, a database 203 and a virtual environment 204 (described later). The system may comprise an optional media server 205. A communication network 206 allows communication between the various components of the system. The communication network may be any suitable network. The clients 202 and the central server 201 are implemented on a computing device 100 described earlier.

The clients 202 are adapted to communicate with the central server 201. The clients 202 are arranged to communicate with each other in the virtual environment 203 via the central server 201. The central server 201 creates the virtual environment and manages or controls the data flow to and from the virtual environment 204. The instructions regarding the contents of the virtual environment may be stored on the database 203, and can be accessed by the central server. In another form the system may include a further media server 205 that controls the media data sent to and from the virtual environment. The media server 205 is adapted to be in communication with the central server 201, and may in some forms be controlled by the central server. The media server 205 may be arranged to communicate with the database 203 also.

Figure 3A:
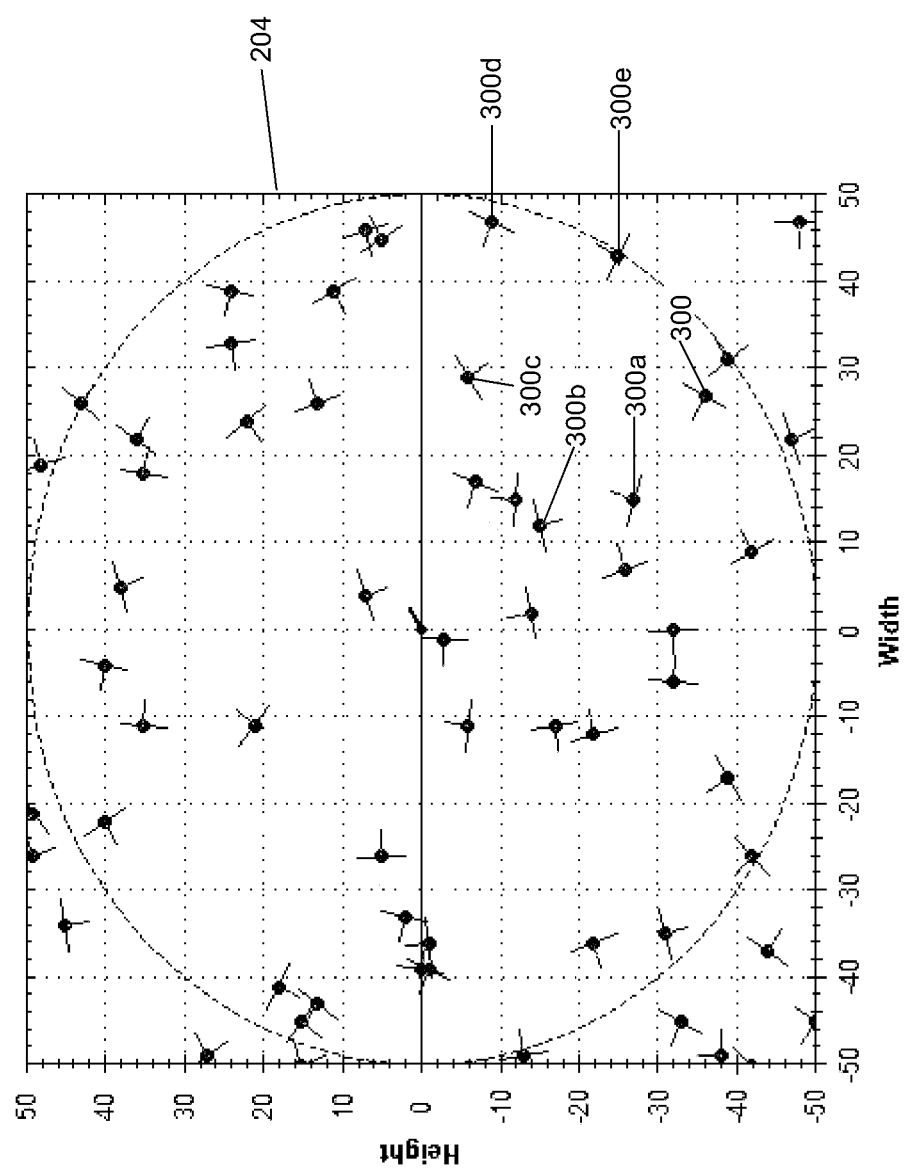
FIG. 3a is a schematic representation of a virtual environment with a plurality of avatars.

The central server 201 creates and manages a virtual environment 204. The virtual environment, in one form, is a 3D (three dimensional) environment adapted for video conferencing. FIG. 3a shows an image of the virtual environment with two avatars that each represent a corresponding client within the virtual environment. The figure shows a 2D (two dimensional) image of the virtual environment. There are a plurality of users and the users can interact with the virtual environment through the clients 202. The clients 202 may include a user interface such as a screen or display that allows a user to view the virtual environment and view and interact with other avatars in the virtual environment.

The database 203 stores instructions regarding the components of the virtual environment. The database may be arranged to store a plurality of different types of virtual environments. The database may include instructions or information regarding graphics, rendering, bounds, limits and objects that are common to all virtual environments. The database 203 can be accessed by the server 201 that uses information relating to a virtual environment to create the virtual environment 204. Once the virtual environment is created it can be populated with participants. The central server 201 receives information from the clients 202 that want to be positioned in the virtual environment as participants. The central server may process information from the database and the clients in order to create a virtual environment and populate the virtual environment with participants.

In another form the media server 205 receives instructions regarding creation of a virtual environment from the central server 201. The media server may access the database and use the stored information to create a virtual environment. The media server 205 may also receive instructions relating to the clients 202 from the central server 201. The media server 205 can process this information and populate the virtual environment with participants. In an alternate form the clients 202 may communicate with the media server 205 directly, the media server processing the information from the clients 202 and populating the virtual environment with participants. In this alternate form the media server may communicate directly with the database 203 to gather necessary information in order to create a virtual environment.

A networking system is illustrated in the Figures. The system illustrates a networking method that allows users to correspond with live video and audio streams.

The networking method comprises generating a virtual environment and populating the virtual environment with a plurality of avatars 300. The avatars 300 each represent a corresponding user. Each avatar 300 displays a video stream of the corresponding user that is displayed in the virtual environment. The avatars 300 also define a virtual view point from which the virtual environment is reproduced for the corresponding user.

Each user controls the movement of the corresponding avatar within the virtual environment. The movement of the avatars within the virtual environment is monitored by the central server 201. The server 201 also captures a media stream from the virtual view point of each avatar as users navigate the virtual environment. The captured media stream is displayed to the user on a corresponding local client (such as the user's personal computer).

The server 201 determines a location orientation and angle of line-of-sight of each avatar with respect to each other within the virtual environment. The media stream displayed to the corresponding user is generated based on the location, orientation and angle of line-of-sight for the corresponding avatar. The server 201 may construct the media stream for each avatar using techniques that are disclosed later in this specification.

The server 201 ideally determines a virtual distance between avatars within the virtual environment. The virtual distance may be used to moderate the quality of the video stream relayed to a user's local client. One factor in the quality of an avatar's video stream (as reproduced in the media stream of another avatar) is based on the proximity of the respective avatars within the virtual environment. The server 201 may reduce the bit rate and/or frame rate of the reproduced video stream for distant avatars to moderate the video stream quality.

The server 201 may generate a virtual display screen that displays images sourced from a client (associated with an avatar within the virtual environment) in the virtual environment. The virtual display screen being visible within the virtual environment.

The illustrated networking system comprises a server that hosts a virtual environment and a plurality of user avatars stored in server memory. The server 201 is connected to a data network. The avatars are accessible through the data network. Each user avatar displays a video stream of a corresponding user. Typically, the video screen will display the output from the video camera associated with by the client in the video conference. The avatars also define a virtual view point that dictates the perspective of the virtual environment that is relayed to a corresponding user. The server 201 documents movement of the avatars within the virtual environment and defines a media stream that is captured from the virtual view point of each avatar. The media stream is relayed to a corresponding user.

The server 201 determines a line-of-sight for each avatar within the virtual environment. The line-of-sight defines the media stream that is relayed to the corresponding user. The server 201 may direct the transmission of the video stream associated with each avatar (based on the corresponding line-of-sight) directly between clients associated with the avatars. Alternatively, the server 201 may receive the video stream associated with each avatar and relay the media stream for each avatar to a corresponding user's local client. This increases the bandwidth loading on the server 201 (as the server 201 receives a full video stream for each user client), but reduces the bandwidth loading on the individual clients (as the local clients only receive the video stream for other avatars that are within their line-of-sight).

Figure 3B:
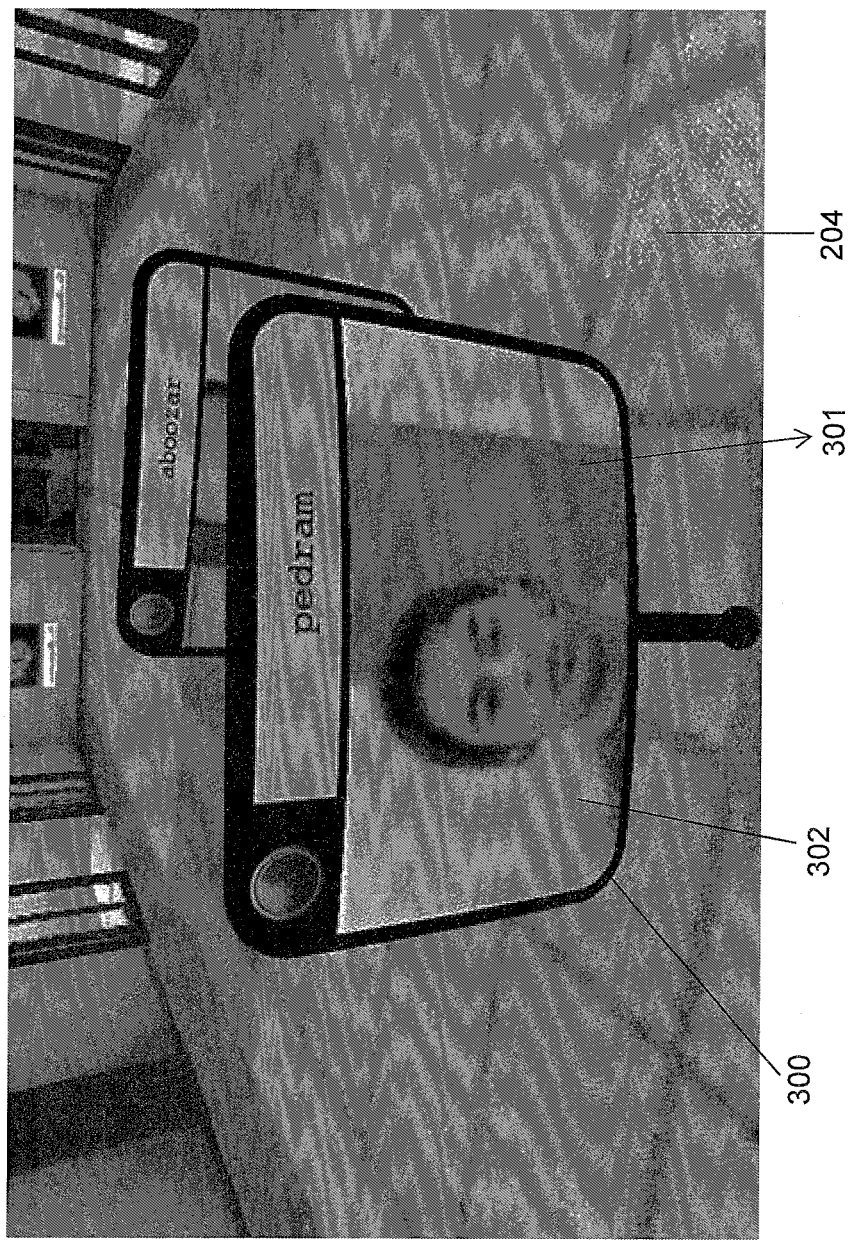
FIG. 3b shows one form of an avatar in the virtual environment.

The virtual environment may include a plurality of avatars 300a, 300b, 300c, 300d, etc. as seen in FIG. 3a. Each one of the avatars exist in the environment in the form of a simplified visual representation of the user. The avatar may take any suitable form and may be customisable to allow a user to create their own avatar. As shown in FIG. 3b, the avatar 301 includes a display 302. The display in one form is a live video feed. The video feed can be recorded and streamed live from a video recording device such as a camera that may be associated with the client 202. The video stream is transmitted to the central server 201 and then projected into the virtual environment as part of the avatar. In another form the video stream may be sent by the server 201 to the media server 205 which then transmits the information to the avatar in the virtual environment 204.

The clients 202 may be able to communicate with the virtual environment in order to control the avatar 300 associated with the client. The user can control the motion of the avatar 300 in the virtual environment. Avatars can move freely within the virtual environment and an avatar can interact with other avatars. The illustrated avatars display a corresponding user's multimedia data feed. Users can therefore communicate with other users in the virtual environment through their respective avatars. A user can speak directly to another user via the multimedia data feed of the other user's avatar.

The avatars also include a virtual camera 303 that receives multimedia data from other avatars. The multimedia data streams are transmitted either to the media server or the central server and then transmitted back to the end user associated with the avatar 300. The camera 302 allows the end user to view the virtual environment and the avatars of other users, and receive communication from the other users in the virtual environment through their respective avatars. The multimedia data stream can involve video and audio data, or simply video data or simply audio data.

Figure 3C:
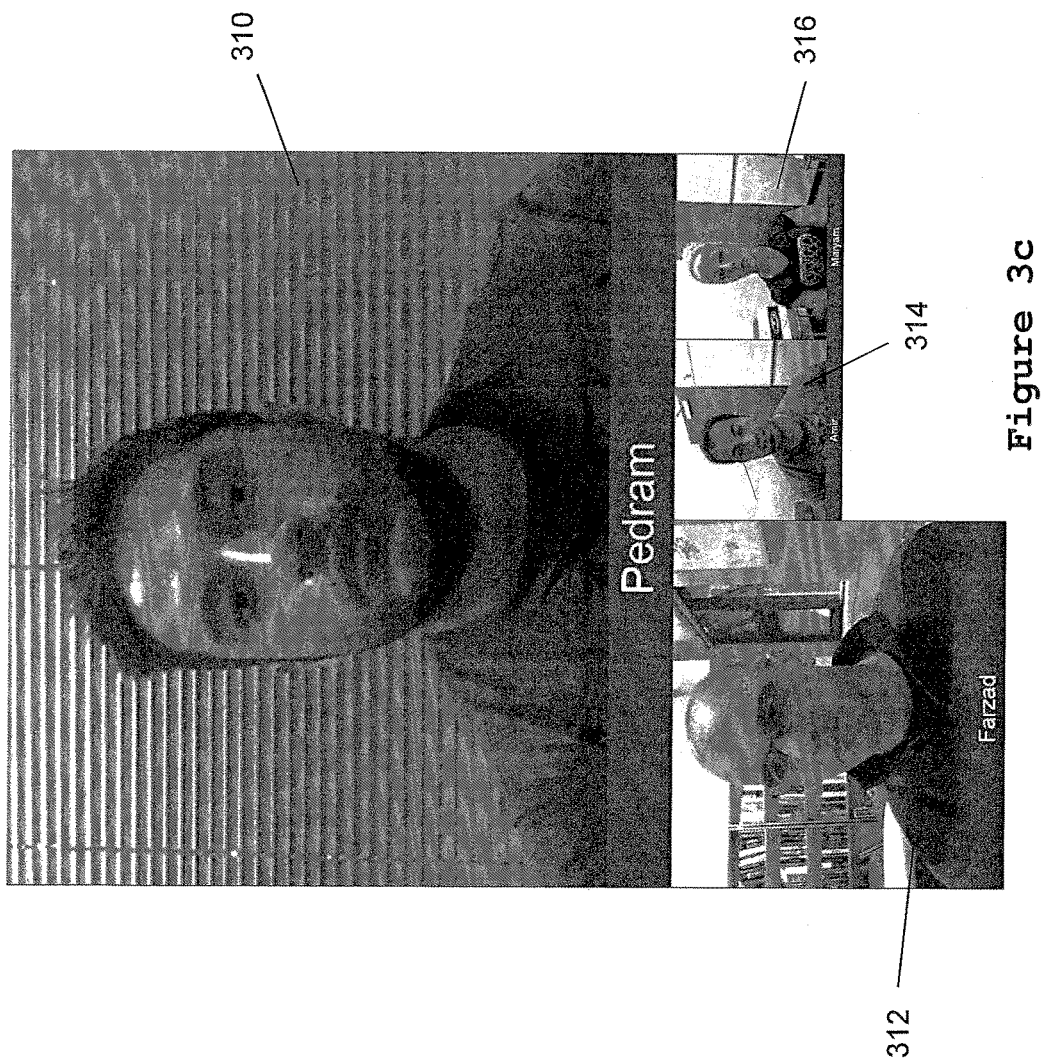
FIG. 3c shows one form of a plurality of avatars in the virtual environment.

In a second form, the virtual environment is a 2D (two dimensional) environment adapted for video conferencing. FIG. 3c shows an image of a virtual environment including multiple users where the users can interact with the environment through clients 202. The clients 202 may include a user interface such as a screen or display that allows a user to view the virtual environment and view and interact with other avatars in the virtual environment.

As discussed above with respect to FIGS. 3a and 3b the database 203 stores instructions regarding the components of the virtual environment. Database 203 can be accessed by server 201 that uses information relating to the virtual environment to create the virtual environment. In FIG. 3c each avatar displays a video stream of the corresponding user that is displayed in the virtual environment. In the example of FIG. 3c a plurality of rectangular avatars 310 312 314 316 exist in the form of a video representation of the user. In FIG. 3c the avatars are displayed as tiles within a single block video image. The avatars have different sizes.

Figure 3D:
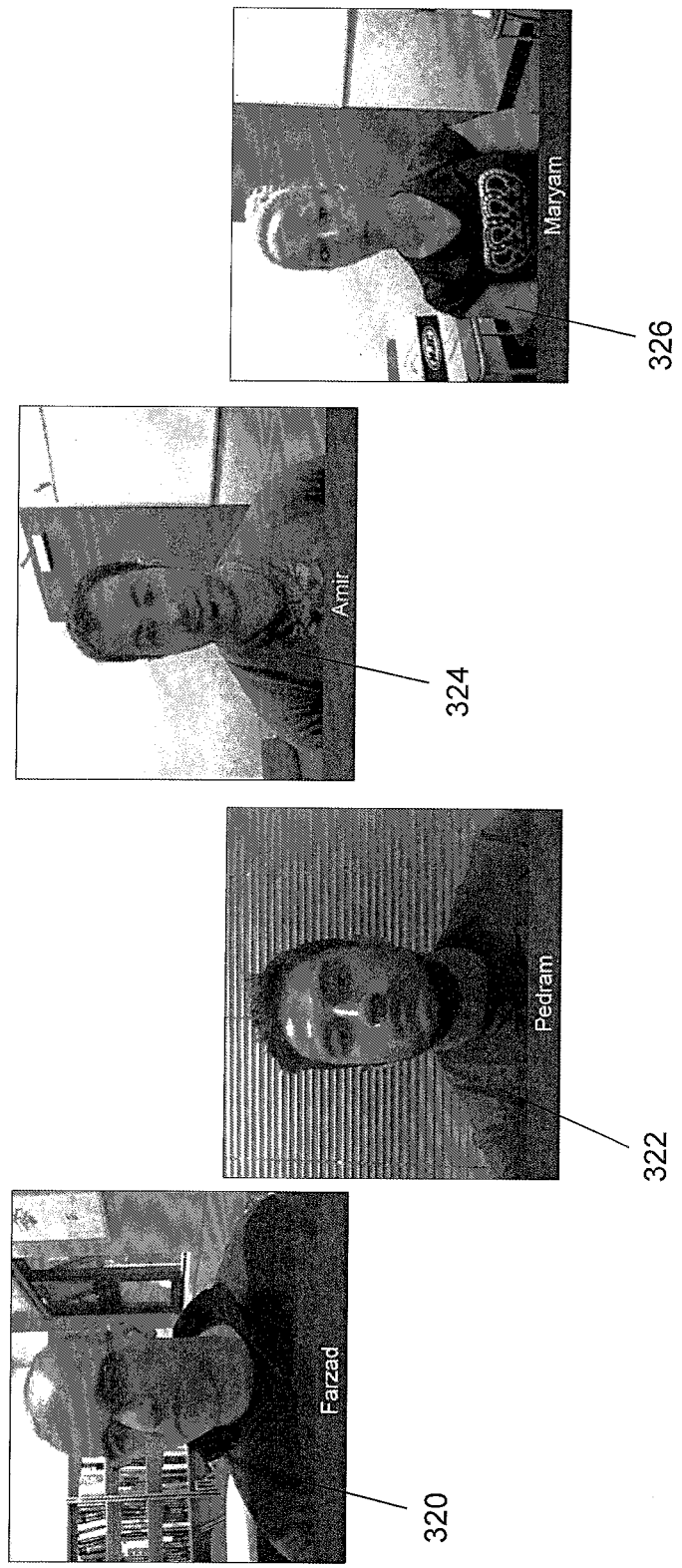
FIG. 3d shows one form of a plurality of avatars in the virtual environment.

FIG. 3d shows a further environment adapted for video conferencing. In FIG. 3d each avatar displays a video stream of the corresponding user that is displayed in the virtual environment. In the example of FIG. 3d a plurality of avatars 320 322 324 326 exist in the form of a video representation of the user. In FIG. 3d the avatars are displayed as individual rectangular 2D images spatially arranged across the virtual environment. The avatars are all arranged at the same angular orientation facing directly out of the virtual environment.

Figure 6:
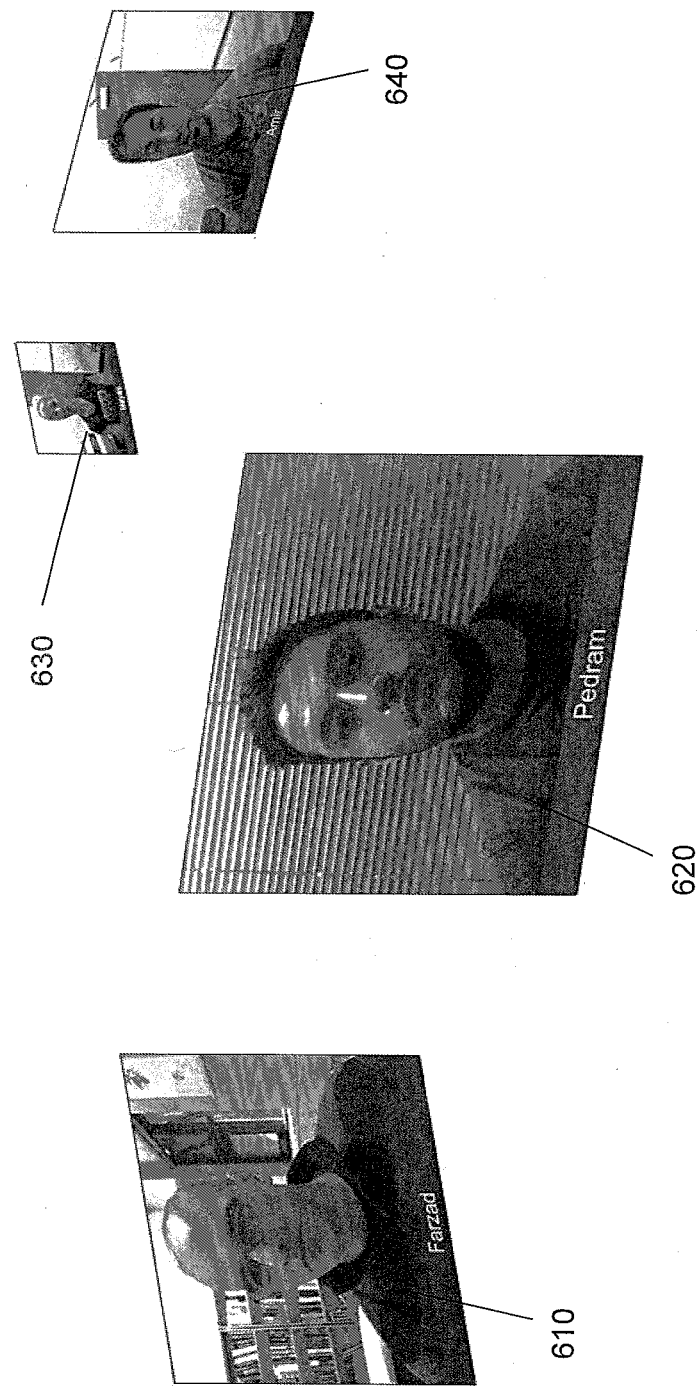
FIG. 6 shows of a plurality of avatars in the virtual environment.

FIG. 6 shows a further environment adapted for video conferencing. In FIG. 6 each avatar displays a video stream of the corresponding user that is displayed in the virtual environment. In the example of FIG. 6 a plurality of avatars 610 620 630 640 exist in the form of a video representation of the user. In FIG. 6 the avatars are displayed as individual images spatially arranged across the virtual environment. The avatars are arranged at different angular orientations within the virtual environment. The avatars have different sizes.

In the specification the word avatar relates to a virtual representation of a user in the virtual environment. The avatar is an electronic representation of a user that can communicate with the network and system components described earlier. Where ever there is reference to an avatar performing an action it will be understood it is the client associated with that avatar that is performing that action in the physical world.

FIG. 4a shows a method for managing multimedia data in a virtual environment. This method is ideally implemented on each individual client 202. The method comprises the steps of:
i. determining one or more avatars that satisfy at least one pre-determined criterion defined for an end user, at step 401;
ii. requesting multimedia data for the one or more avatars that meet the at least one predetermined criterion, at step 402; and
iii. receiving and displaying the multimedia data to the end user, at step 403.

Figure 4B:
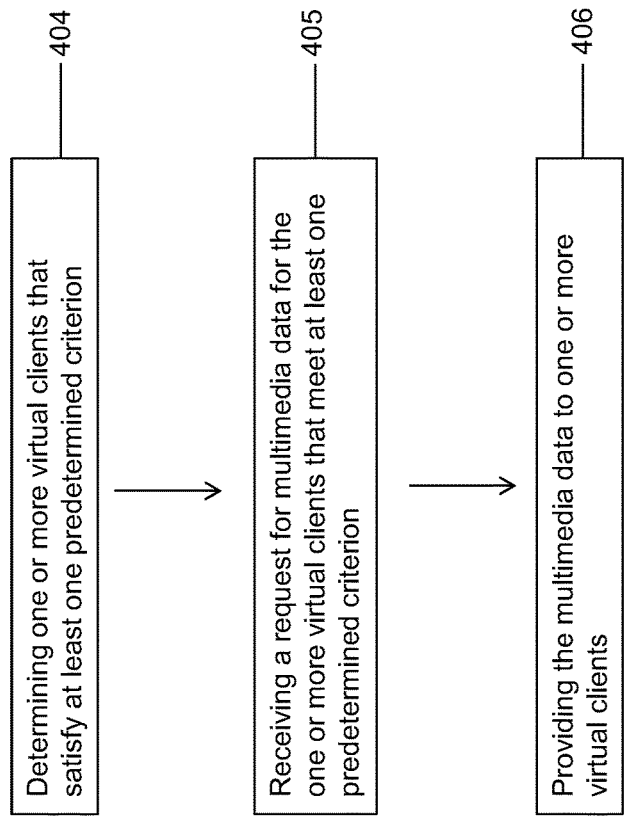
FIG. 4b is a flow chart that shows a general method of managing multimedia data in a virtual environment as implemented by a central server.

FIG. 4b shows another method for managing multimedia data in a virtual environment. This method may be implemented by the central server 201 or the media server 205. The method comprises the steps of:
i. determining one or more avatars that satisfy at least one predetermined criterion defined for an end user, at step 404;
ii. receiving a request for multimedia data for the one or more avatars that meet at least one pre-determined criterion, at step 405; and
iii. providing the multimedia data to one or more end users, at step 406.

The pre-determined criterion specified in both methods may include at least one data culling technique applied to one or more of the avatars in the virtual environment.

Possible data culling techniques include:
(a) a view field culling technique;
(b) a visibility culling technique;
(c) a back face culling technique; and/or
(d) an occlusion culling technique.

Examples of possible data culling techniques are already described in the applicant's patent application WO 2013/003914. The view field culling technique includes defining a view field for each avatar. Each avatar 300 includes a view field which is defined in a coded set of rules. The rules regarding the size of the view field can be modified and altered by an authorised person such as an administrator. These rules may be stored on the database, or the central server 201 or the media server 205.

Figure 5:
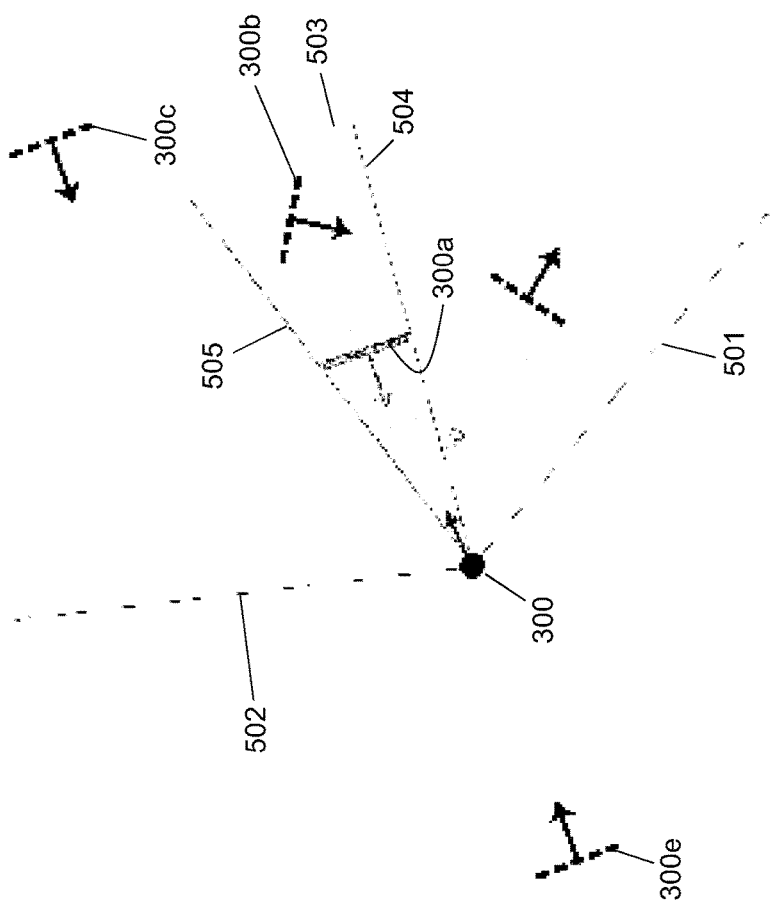
FIG. 5 shows an example view field of an avatar and shows other avatars in and out of the view field.

FIG. 5 shows an example of a view field of an avatar. The view field 500 can take any suitable geometric shape. The edges 501, 502 of the shape define the limits of the avatar's view field (which corresponds to the view of the virtual environment relayed to the respective end user). FIG. 6 shows a view field in the shape of a triangle (when viewed from above in two dimensions).

The view field may be any other suitable shape that extends outwardly from the avatars. For example, the view field may be a diverging shape originating at the avatar 300. The maximum visibility range is defined by the edge 503 of the view field.

In one form the central server 201 determines the location information of each one of the avatars in the virtual environment. The central server 201 may also determine the orientation of the avatars relative to the other avatars. The central server 201 can transmit this information to the clients such that the clients are aware of the location and orientation of the other avatars in the virtual environment. In an alternate form the individual clients may determine the orientation of other avatars within the virtual environment. The client may also determine the position of the other avatars within the virtual environment.

Certain view field culling techniques include the step of excluding or culling avatars that are outside the view field 500 of the local avatar. As seen in FIG. 5, avatars 300d and 300e are outside the view field 500, and hence the multimedia data from these avatars (300d, 300e) are not delivered to the client associated with the local avatar 300. This results in a reduction of total bandwidth usage due to a reduced amount of multimedia data being transmitted across the network 206.

The visibility culling technique includes the step of excluding all the avatars that are located beyond the maximum range of visibility. If an avatar 300c is outside the maximum visibility range of the local avatar 300, then the multimedia data for the avatar outside the visibility range is not delivered to the local avatar 300, reduces the total bandwidth requirement.

The back culling technique involves the step of excluding avatars that have their back facing the local avatar 300. The local avatar 300 uses orientation information to determine which avatars are facing away (i.e. the orientation of the other avatar relative to the local avatar). If another avatar (for example, avatar 300d) is facing away from the local avatar 300, then the video data of the back facing avatar is not required by the client associated with the local avatar 300. As seen from FIG. 5, avatar 300d is facing away from the avatar 300, hence the multimedia data of avatar 300d is not supplied to avatar 300, thereby reducing the bandwidth requirement across the network because less video data is being transmitted over the network.

The occlusion culling technique involves the step of determining which avatars are covered by other avatars from the perspective of a local avatar. If an avatar is fully occluded or partially occluded by an object within the virtual environment or another avatar, then video data for the occluded avatar is not delivered to the client associated with the local avatar. As can be seen from FIG. 5, the angle of the occlusion lines 504 and 505 (lines that emanate from the view point and extend to the extremities of the occluding avatar to define the 'shadow' created by the occluding avatar in the local avatar's view field) are calculated ($\alpha$ and $\beta$) for each avatar. The angle from $\alpha$ to $\beta$ is termed the avatar's blocking angle range. This angle defines the part of the local avatars view that is blocked due to another avatar being present in the view field. From the nearest avatar to the furthest avatar, an overlap test is applied to check if the blocking ranges of avatars result in any overlap within the total visible angle range of the local avatar. Each avatar's blocking angle range is first compared to the blocked area. If there is any overlap, then further testing needs to be done to determine avatar priority (based on proximity to the local avatar), otherwise it is assumed that the avatar is visible. Finally, the angle range is added to the blocked area.

FIG. 5 shows that avatar 300b is completely occluded by avatar 300a. Since avatar 300b is occluded, the multimedia data of avatar 300b is not delivered to the client associated with avatar 300 because avatar 300 does not have a line of sight to avatar 300b in the virtual environment.

Applying these data culling techniques results in a reduction of the amount of data sent to each client and hence reduces the bandwidth requirements of the network. The data culling techniques only allows multimedia data of avatars that are "visible" to a local avatar to be sent to the corresponding client. The implementation of this data culling techniques simulates "real life" interaction in the virtual environment, meaning the local avatar does not see other avatars that are occluded (either by other avatars or objects within the virtual environment) facing away, or outside a defined field on view (such as behind the local avatar).

Each client may maintain a list of visible avatars and requests multimedia data relating to the visible avatars. The visible avatars are determined by applying one or more of the data culling techniques described earlier. In one form the client requests multimedia data for visible avatars from the central server 201. The central server 201 gathers multimedia data from all the avatars and only sends multimedia data for the identified visible avatars. In another form the client for a local avatar requests multimedia data from other clients that relate to visible avatars.

The applicant has appreciated that the perceptual requirements of an image by an avatar, or viewer also vary depending on the current perspective of the viewer to the image. As the viewer moves from a face to face viewing of the image to viewing at an angle, the applicant has identified that the quality of parts of the image can be degraded without producing any reduction in the perceived quality of the image. This technique of varying the quality of the image is referred to in this specification as 'pruning'.

It will be clear that the perceptual requirements of an image by an avatar are also applicable in an environment in which images are static in orientation and displayed facing out of the virtual environment, as shown in the examples of FIGS. 3c and 3d. The images may be different sizes. In such environments the viewing angle is perpendicular to the face of the image. The perceptual requirements are also applicable in an environment in which images are positioned at different angles as shown in the example of FIG. 3e. In the ongoing discussion references to 3D environment should also encompass environments in which images are provided at different sizes and angular orientations.

Bandwidth of Network 206

In typical network situations the available bandwidth can change with time. Variations in available bandwidth can occur due to several reasons. For example, a network may become congested if separate devices or applications connected to the network start transmitting or receiving data across the network. In some situations the bandwidth of the network may become reduced due to distance between the network and the client device or interference, a typical example is in a wireless network where the client may be moving with respect to the transmitter or other factors including moving objects may interfere with the transmission path between the client and the transmitter. Limitations in bandwidth can result in the required network capacity for transmission of the visible avatars' videos at the desired quality exceeding the actual available network capacity. As discussed above the capacity can vary over time.

In embodiments the system monitors the quality of the received data streams to determine any loss in the signal between the server and the client. In embodiments, the data packets are labelled at transmission. Typically, the data packets are labelled consecutively. As part of the reconstruction process for the data streams, the client identifies the labels of the data packets and in order to reconstruct the data stream correctly.

Any loss of data is detected by failure to receive consecutively labelled data packets. The loss of data across the network is typically random and unpredictable which produces variation in the quality of the video experience at the client. The data loss may affect multiple video streams that are associated with the client's visual scene resulting in the video quality of different avatars randomly reducing and improving.

In embodiments the client determines that data packets have not been received and notifies the server confirming that data has not been received. The server identifies this notification as an indication that the network may be experiencing congestion. The server can respond to the congestion by reducing the data transmitted to the client.

Virtual Saliency

In order to manage quality of experience, on receiving notification of bandwidth limitations the server selectively drops data packets for transmission to provide the least degradation of quality of server to the client.

The system selectively drops data packets based on the 'saliency' or importance of each of the multiple data streams as perceived by the user. Data stream degradation is applied to less salient content and the data streams of more salient content are maintained as high as possible. The system maintains the minimum spatial and temporal resolution with respect to the virtual position and orientation of the avatar in the IVC such that there is no perceptible loss of visual quality is defined as the least required quality. Saliency is determined from the personalised perspective of each client and the saliency of different avatar data streams will be different for different clients.

The virtual saliency ranking (VSR) is a mechanism which determines the importance of the video content of avatars inside an IVC with respect to the viewer (local avatar). This process mimics the real-life behaviour of a human-being interacting with other humans in a crowded environment. When people mingle in a crowded environment, they give different levels of attention to the people in a cluster participating in a conversation. In other words, they rank people in a conversation based on their body languages such as their postures, orientations, distances, activities and etc. As a result, a human being with limited visual field and focal point can mingle in a crowd without missing essential information produced real-time around him/her. For example, in a cluster, the speaker usually receives the highest attention and if someone else starts to talk, the focus of the group gracefully shifts toward the new speaker.

To mimic this behaviour in IVC, virtual factors such as visibility state, distance and orientation with respect to the local client are calculated in real-time. In addition to the mentioned visual factors, avatars' voice activities and rendering frame rate are considered as well, rendering frame rate is the frame rate of the 3D engine and is different and independent from video frame rate. Moreover, the network delay involved in sending the retrieved data to other clients in the distributed model is also taken into account by introducing a prediction factor. The combination of these factors is merged in a unified score that is then used by the system to rank the importance of various elements the aggregated bit rate.

Overall, the representation of the data stream will change as degradation is applied to the data content. For example the representation of the avatar may become more blurred, less defined or update less frequently resulting in less smooth movement of the avatar.

Typically, the saliency ranking of video streams is calculated locally at the client, although in further embodiments it may be calculated at the server.

Scoring

In order to rank the avatars in an IVC, each visible and potentially visible avatar in the environment receives a score for their virtual factors. Then, an overall score, with respect to the given weight of each virtual factor is calculated. Finally the avatars are sorted based on their respective overall scores.

View Frustum Culling:

The process of view frustum culling is based on the prior patent. However, more virtual situations are analysed in the updated algorithm. Furthermore, the visual and prediction states of the avatars are retrieved in this algorithm.

If (Avatar.current is InsideMainViewFrustum) then do
Avatar.PredictionState=NoPrediction
Get VisibleState of Avatar.current based on OcclussionCullingTest
If (VisibleState=CompletelyOccluded) then do
Avatar.PredictionState=ActualAvatarinsideMainViewFrustum
Get VisibleState of Avatar.Predicted based on OcclussionCullingTest
If (VisibleState≠CompletelyOccluded) then do
VisibleSet.add(Avatar.ID)
Else
VisibleSet.Remove(Avatar.ID)
End
Else
VisibleSet.add(Avatar.ID)
End
Else If (Avatar.prediction is InsideMainViewFrustum) then do
Avatar.PredictionState=PredictedAvatarinsideMainViewFrustum
Get VisibleState of Avatar. prediction based on OcclussionCullingTest
If (VisibleState≠CompletelyOccluded) then do
VisibleSet.add(Avatar.ID)
Else
VisibleSet.Remove(Avatar.ID)
End
Else If (Avatar. current is InsideConservativeViewFrustum) then do
Avatar.PredictionState=ActualAvatarinsideConservativeViewFrustum
Get VisibleState of Avatar.current based on OcclussionCullingTest
If (VisibleState=CompletelyOccluded) then do
Avatar.PredictionState=PredictedAvatarinsideConservativeViewFrustum
Get VisibleState of Avatar.Predicted based on OcclussionCullingTest
If (VisibleState≠CompletelyOccluded) then do
VisibleSet.add(Avatar.ID)
Else
VisibleSet.Remove(Avatar.ID)
End
Else
VisibleSet.add(Avatar.ID)
End
Else If (Avatar.prediction is InsideConservativeViewFrustum) then do
Avatar.PredictionState=PredictedAvatarinsideConservativeViewFrustum
Get VisibleState of Avatar. prediction based on OcclussionCullingTest
If (VisibleState≠CompletelyOccluded) then do VisibleSet.add(Avatar.ID)
Else
VisibleSet.Remove(Avatar.ID)
End
Else
VisibleSet.Remove(Avatar.ID)
End Occlusion Culling:

Embodiments use an occlusion culling (OC) method based on ray casting. Due to the huge number of required intersection calculation, the ray casting methods are very complex. However, the proposed ray casting method is a real-time optimised technique, which employs limited number of rays to perform the occlusion culling and back face culling at the same time. In this technique, the view point is not the source of rays but the destination of them. Source of rays are attached to the video surface and can make any arbitrary shape based on the content of the video. Furthermore, each vertex can be given a weight, which indicates the priority of the ray.

Figure 7:
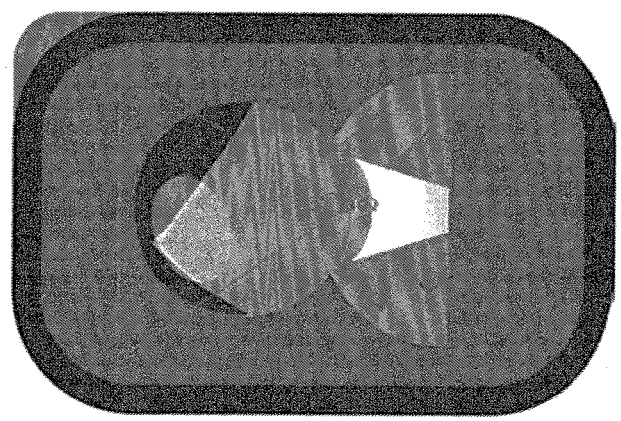
FIG. 7 is an illustration of an avatar.

As an example, in FIG. 7, the sources of rays construct a triangular shape for a talking head video. Vertex A (on the speaker's lips) has the highest priority (weight=2) and Vertices B and C have the same lower priority (weight=1). Rays are emitted toward the view point in order of their priorities. This feature provides a content-aware AOI mechanism, which can be adjusted based on the available capacity of computation.

In the simplest conservative model, from four corners of each avatar's video display, rays with same weight are emitted toward the view point, if all rays are intersected by objects, including other avatars or any static or dynamic opaque object, the avatar's visibility state is determined as completely occluded, otherwise if less than a certain percentage of the rays in terms of their weights (i.e. 25%) are received by the view point, state is set as partially occluded and if more than a certain percentage of the rays in terms of their weights (i.e. 50%) are received by the view point, the mostly visible state is chosen. The key property of this novel model is that the back face culling is inherently provided. When an avatar is rotating away from the view point, the rays would not be received and hence avatar is detected invisible (BFC).

Figure 8:
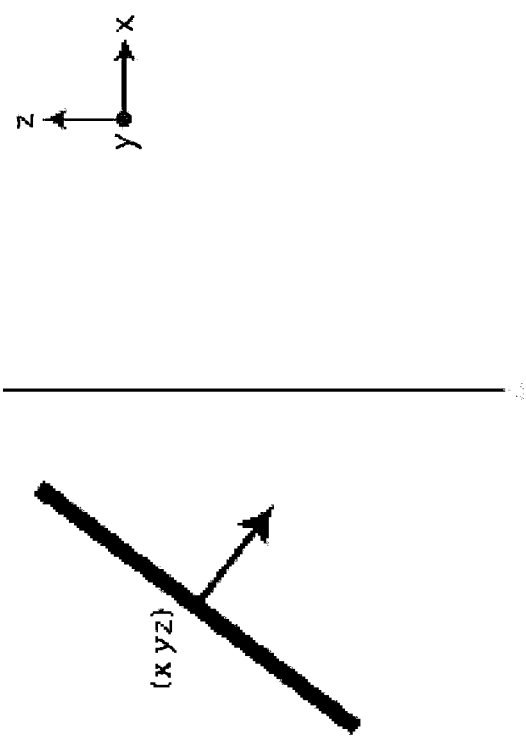
FIG. 8 is an illustration of the orientation of an avatar with respect to a viewer in a virtual environment.

Virtual States:

Distance and Orientation:

If the visibility state of the avatar is not completely occluded, the relative distance and orientation of the avatar to the local avatar (camera) are calculated. As shown in FIG. 8, the relative distance of the avatar to the camera is obtained from Equation 1 and is denoted by d:

$$d = \sqrt{(x-x_0)^2 + (y-y_0)^2 + (z-z_0)^2}$$

Where x0, y0 and z0 represent the Cartesian coordinates of the camera.

The relative angular distance of the viewer (camera) from the normal vector from the video surface is $\beta$, the Euler angle about the local y axis. $\beta 0$ represents the relative angular distance of the centre of the video surface with respect to the camera's normal vector. Avatars with any positions in the scene can be presented by a relative angle of $\beta 0$ which can be calculated with Equation 2.

$$\beta_0 = \beta_c - \left(\tan^{-1}\left(\frac{x}{z}\right)\right)$$

Where is the absolute Euler angle about the y axis of the camera. β can be obtained with a similar equation accordingly.

Scoring:

The distance score is achieved by inverting the normalised relative distance, where the closest distance (d=0) receives the highest score of 1 and the furthest distance receives the lowest score of zero.

The normalised average value of β and β0 is utilised as the orientation score. The highest orientation score is achieved, when the avatars are facing directly toward each other (In the mentioned case, the relative angle between two avatars is 180 degree and location-wise they are located on a straight line, with their video surface normal vectors being aligned with the line, in other words β and β0 are both zero.)

Visibility State and Prediction Factor:

The visibility states of the avatars are obtained by the ray casting mechanism discussed above. As a result of this process, avatars are categorised into one of the following states:

Completely Occluded
Partially Occluded
Mostly Visible

In addition to the visibility state, it is also important to predict if avatar will become visible soon. This is referred to the prediction state, with respect to current motion vectors. The prediction state of the avatar is also achieved from this process as follows:

No Prediction
Actual Avatar Inside The Main View Frustum
Predicted Avatar Inside The Main View Frustum
Actual Avatar Inside The Conservative View Frustum
Predicted Avatar Inside The Conservative View Frustum No prediction indicates that the actual avatar is visible and located in the main view frustum and would not exit the view frustum, rotate or gets occluded during the interval between sending the request and receiving the response known as network delay.

Actual Avatar Inside The Main View Frustum shows that the actual avatar is inside the view frustum, but eliminated in the process of back-face culling due to the relative orientation of the avatar to the viewer. However, the avatar will potentially become visible during the network delay.

Predicted Avatar Inside The Main View Frustum specifies that the actual avatar is not located inside the main view frustum. However, the prediction of the avatar will be located at the main view frustum and can potentially become visible during the network delay.

Actual Avatar Inside The Conservative View Frustum means that although the actual avatar is not located at the main view frustum, it is located and visible inside the conservative view frustum.

Finally Predicted Avatar Inside The Conservative View Frustum suggests that the actual avatar is not located in the conservative view frustum at the current point in time. However, the prediction of the avatar is located in the conservative view frustum.

Scoring:

A dynamic or constant score value can be assigned to each state. So they can be exploited as the final visibility score and prediction score. For instance scores of 1, 0.5 and 0 can be assigned to the visibility states of mostly visible, partially occluded and completely occluded respectively. Likewise scores of 0, 0.1, 0.2, 0.3 and 0.4 can be given to the prediction factors of no prediction to Predicted Avatar Inside The Conservative View Frustum respectively.

Voice Activity:

Unlike other factors voice activity is not a visual factor, which affects the visual results immediately. Hence, presence and absence of this factor should be handled gracefully. To obtain such an outcome, the corresponding score is increased by a certain increment (e.g. 0.02) while the user is speaking. On the other hand, during the silence periods the score is decreased by another value (e.g. 0.01). Consequently, the overall score of the client grows gradually for every second that the speaker is active and drops slightly for every second of silence until it reaches to the calculated score based on visual factors. In embodiments, the score would not be decreased further when it reaches to the visual based scoring.

Overall Scoring:

The overall scoring given to an avatar from the perspective of the viewer is calculated using a combination of the different scores discussed above and the weight allocated to each scoring factor. For example, each type of score is allocated a particular weight. The weighting factors may be varied in different situations or for different clients. For example, in an embodiment in which the proximity to the viewer is more important than the angle, the weight associated with the distance score (DistanceWeight) is greater than the weight associated with the angle (beta) score (BetaWeight). Additionally, weight is given to the voice activity (VoiceActivityWeight).

The overall score may be obtained by Equation 3:

$$VisibilityScore \times$$
$$((DistanceScore \times DistanceWeight + BetaScore \times BetaWeight +$$
$$VoiceActivityScore \times VoiceActivityWeight) /$$
$$(DistanceWeight + BetaWeight + VoiceActivityWeight) -$$
$$PredictionFactor)$$

Figure 9:
FIG. 9 shows a plurality of avatars in the virtual environment.

An example of the rankings of the avatars in FIG. 9 is provided in the table below:

| Avatar | Distance Score | Beta Score | Voice Activity Score | Overall Score | Rank |
|---|---|---|---|---|---|
| PEDRAM | 0.75 | 0.92 | 1.00 | 0.85 | 1 |
| FARZAD | 0.63 | 0.64 | 1.00 | 0.69 | 2 |
| ABOO | 0.64 | 0.49 | 1.00 | 0.65 | 3 |
| VICTOR | 0.56 | 0.56 | 0.00 | 0.47 | 4 |

Video Quality Determination:

The perceptual pruning mechanism described in PCT/AU2014/000860 utilises three of the visual factors (β0, β and d) to calculate the required spatial resolution of each video sequence at their respective virtual situations. Thus, by passing these values to the perceptual pruning system (local or remote), video frames with spatially accurate resolutions can be achieved and assigned to their video surfaces. However, in a congested situation, the quality of video should be sacrificed to reduce the network capacity consumption of the system. We have done extensive user studies using talking head videos in IVC and realised that subjects tolerate frame rate reduction to (a certain level) more than reduction in spatial resolution and spatial resolution degradations lower than projected sizes of the video surfaces (based on achieved mathematical model) are very unnoticeable to them. Hence, the resolution of video is decreased by dropping frame rates based on pre-set levels first and then if more reduction beyond those levels is required, the spatial resolution of the video sequence will be degraded based on the least noticeable reduction first and then continued to harsher reductions.

The spatial resolution reduction is achieved by changing the mentioned visual factors utilised by perceptual pruning system (Multiple regions based on these factor are defined in which the obtained resolutions are distinctively different, based on the virtual situation of the avatar, the selected region is pushed one level back which reflects in new visual factors ($\beta 0$, $\beta$ and d)). Note that degradation is applied from the lowest ranking avatar to the highest ranking avatar. It should be also considered that from the network perspective the bitrate should be decreased by x bits per second to have a stable situation. In other words, to resolve the congestion the video contents overall bitrate should be decreased to a value lower than the actual available bandwidth. Nevertheless, the available bandwidth and virtual situation of avatars are both dynamic and might change very rapidly. Hence, the congestion management system should predict the future situation and consequently ranking of each avatar and the minimum required bandwidth of each stream and then based on degradation levels (temporal and spatial), determines levels of qualities for the video streams of avatars with different rankings at which the overall bitrate falls into the stable rage of bandwidth consumption and it has the least perceptual impact on the viewer.

In this process first a rough value in terms of bitrate for each video quality level is considered, better estimation of these values are later obtained for each stream by measuring and averaging the bitrate at each quality level during the process. When the network component informs the congestion manager that the downstream channel is congested, it also provides the bitrate of each stream at the current situation. The congestion manager, calculates the levels of video qualities for each stream in a way that the overall bitrate reaches to a value below x percentage (e.g. 50%) of the current usage (we call this sudden drop). The highest reduction is applied to the lowest ranking avatars and the system attempts to maintain the highest ranking avatars at their best resolution, if it is possible. Then after a defined period of t1 (e.g 4 seconds) the congestion manager tries to increase the bandwidth by y percentage (e.g. 5 percent) to get back to the normal situation (we call this phase as a revival phase). After increasing the bitrate, the system stays at that level for t1 seconds again. If no congestion signal is received from the network component, the overall bitrate is flagged as a secure bitrate and the process is repeated until either it reaches to the normal situation, where all avatars have their desired video resolution or it receives another congestion signal. If so, the system would back off to the last flagged bitrate and stays there for t2 seconds (e.g. 30 sec) and tries again after that period (we call it temporal period), if for any reason, the system receives congestion signal at a secure bitrate level, it drops the target bitrate by another y percentage and resets the secure level and tries again from the achieved bitrate level and repeats the same process. The worst case scenario would be that all the video contents are stopped. According to the explained behaviour the highest ranking avatar would be the first video content that system tries to revive.

Note that the target video frame rate is always clipped by the highest rendering frame rate due to the fact that higher video frame rate are not perceivable as they would never be rendered.

Figure 10:
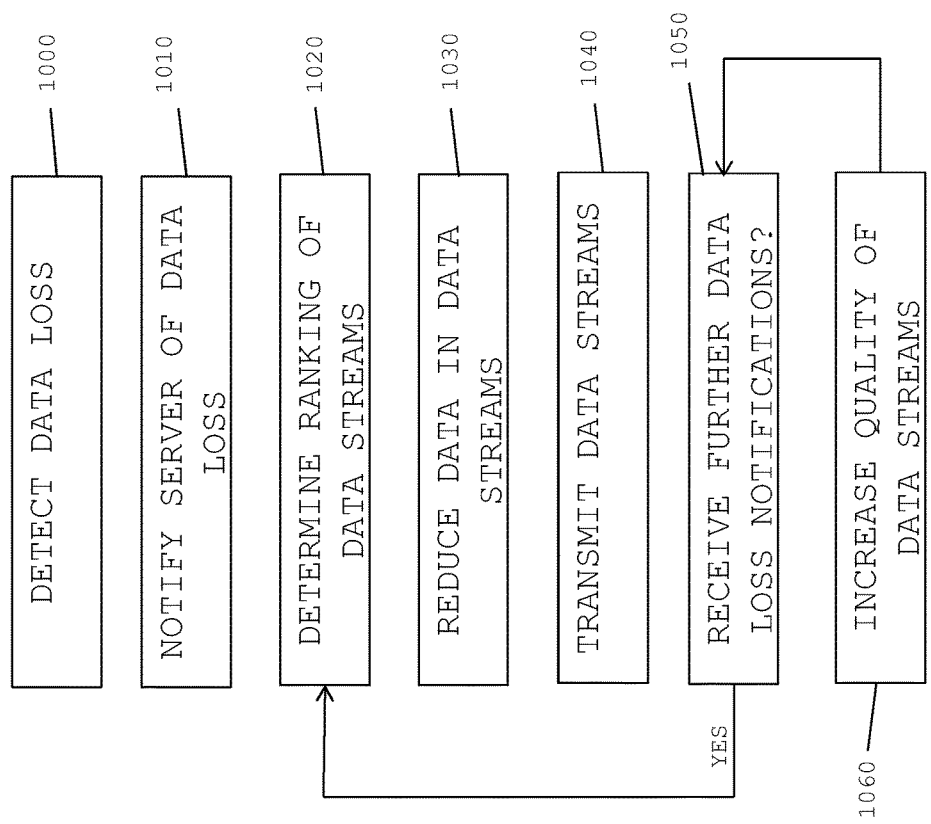
FIG. 10 is a flow diagram showing steps performed in an embodiment.

FIG. 10 shows the steps taken in a further embodiment. At 1000 the client detects data loss in at least one data stream associated with avatars in a virtual environment. The client notifies the server of the data loss at 1010. At 1020 the server identifies the ranking of each of the data streams associated with avatars in the virtual environment. As discussed above, the ranking takes account of various interactive features specific to the virtual environment as displayed by the client, including distance between the avatar and the viewer, the angle of avatar with respect to the viewer or the voice activity of the avatar. The rankings of the different avatars and associated data streams are specific to the client. At 1030 the server reduces data in data streams based on the ranking of the different data streams and transmits the data streams to the client at 1040. If the server receives further notifications of data loss at 1050 it makes further reductions in the data stream content at 1020 based on the rankings of the different data streams at 1020/1030. If no further notifications are received after a predefined time period, the server increases the quality of the data streams at 1060.

In the example above, the saliency ranking is used as a factor to control the reduction of video or audio quality of signals distributed from the central server 201 in a congestion situation. The saliency ranking can be used for other applications during a video conference.

In a further example the representation of an avatar can be changed based on its saliency ranking. The representation of an avatar may be changed, for example, to draw attention to a particular avatar or to remove attention from an avatar. In an example embodiment, the colour of an avatar may be varied depending on its saliency ranking. For example, the highest ranked avatar may be represented in red to attract attention to that avatar. Lower ranked avatars may be represented in different colours or may be greyed out. Typically, control of the representation in such embodiments would be performed locally at the client. On receiving the various data streams from the server, the client determines the ranking of each received data stream and controls representation of that data stream depending on the ranking of each data stream.

In further embodiments, other cosmetic changes are made to the avatars at the client based on the saliency ranking of the avatars. For example, the representation may be changed to produce a different physical appearance for the avatars. In an example, client 202 determines the saliency ranking of the data streams and applies a change in the appearance of the avatars based on saliency ranking. In an example, a halo is added to the avatar having the highest saliency ranking. In further embodiments a crown is added to the avatar having the highest saliency ranking. Further variations in the representation of the avatar are within the scope of the application.

In a further example, the audio level for different avatars is adjusted depending on the saliency ranking. On receiving data streams from the central server 201, client 202 adjusts the audio level depending on the saliency ranking of the avatar. For example, the audio level for the highest ranking avatar is increased to increase the attention on that particular avatar.

In each of the embodiments described above, the representation and audio levels of avatars may be varied depending on the saliency ranking. The client may make adjustments to all data streams or only data streams associated with the highest ranked avatar.

In further embodiments a combination of applications may be applied to data streams. For example, the sever may reduce the data of data streams and, in addition, the client may apply a combination of representation factors including colour, features and audio adjustment.

Area of Interest state:

With the addition of saliency ranking, the avatars are scored based on multiple complex virtual states. Hence, the area of interest state is achieved by quantising the overall scores. As a result, an arbitrary number of area of interest states can be achieved, if required to obtain a fine grained control over bandwidth management. Furthermore, higher area of interest states are more likely to represent the avatars that are more important to the viewer.

It will be clear to those skilled in the art that the visual experience of different participants in the system may vary depending on their virtual position within the virtual environment and also any bandwidth limitations associated with their specific network connection. In embodiment of the invention the server controls the quality of data streams transmitted to different clients specifically based on the virtual environment experienced by the client and the network conditions experienced by the client. Therefore, the management of the data transmission by the server is specific to the client.

The embodiments described above relate to video conferencing systems. The application of embodiments of the invention is not limited to video conferencing systems. For example, multiparty audio systems can utilise embodiments in which the audio streams of participants are ranked and, in situations of limited bandwidth, the data content and quality of those audio signals is varied based on the ranking of those data streams. Embodiments of the invention are applicable to any system in which the significance of different data streams varies between data streams and in which network or transmission limitations require some reduction in the data content on the data streams.

In the embodiments above data streams associated with different participants have been discussed at length. Data streams represent data associated with a user, including video and audio data content. It will be clear to those skilled in the art that data streams may be combined or mixed for transmission across a network and this this is within the scope of this disclosure. In some cases data streams may be split and mixed and re-configured on receipt to reproduce the content of the separate data streams.

The invention claimed is:

1. A method for controlling the representation of at least one data stream in a multi-participant application, comprising the steps of:
    transmitting a plurality of data streams from a server to a client across a communications network, each data stream being associated with a participant in a multi-participant video application;
    determining a data stream ranking associated with at least one of the plurality of data streams; and
    selectively controlling the representation of at least one of the plurality of data streams in a client application in dependence on the data stream ranking;
    wherein the representation of a data stream comprises a representation of the participant associated with the data stream rendered in a virtual environment, the representation being positioned spatially within the virtual environment; and
    wherein the data stream ranking of a data stream is dependent on at least one of the following factors:
    the position of the representation in the virtual environment with respect to a virtual viewpoint;
    the orientation of the representation in the virtual environment with respect to a virtual viewpoint;
    the visibility of the representation in the virtual environment with respect to a virtual view point; and
    the prediction state of the representation in the virtual environment.

2. A method according to claim 1, wherein the data streams are associated with participants in a multi-participant application, wherein a first participant is associated with a first data stream and at least one further participant is associated with at least one further data stream and wherein the step of transmitting comprises transmitting the at least one further data stream to a client associated with the first participant.

3. A method according to claim 1 comprising the further step of receiving notification of data loss from at least one data stream over the communications network and wherein the step of controlling the representation of the data stream comprises selectively reducing data content on at least one data stream in dependence on the data stream ranking.

4. A method according to claim 1 wherein the step of controlling the representation of the data stream controls the representation of the participant rendered in the virtual environment, and wherein the step of controlling the representation includes at least one of:
    controlling the colour of the participant rendered in the virtual environment;
    controlling the physical appearance of the participant rendered in the virtual environment; and
    controlling the audio level of the representation of the participant rendered in the virtual environment.

5. A method according to claim 3 wherein the step of selectively reducing data content is performed to maintain the saliency of the representations in the virtual environment.

6. A method according to claim 3 further comprising the step of, after a predetermined time period, selectively increasing data content on at least one data stream.

7. A method according to claim 3 wherein the data content is reduced by at least one of spatial reduction, reducing the frame rate of the data, and reducing the bitrate of the video data.

8. A method according to claim 3, wherein the step of receiving notification of the data stream ranking at the server, and wherein the step of reducing data content on at least one data stream is performed in response to receiving notification of the data stream ranking.

9. An apparatus for controlling the representation of at least one data stream in a multi-participant application, comprising a server and a client, comprising:
    transmitter for transmitting a plurality of data streams from a server to a client across a communications network, each data stream being associated with a participant in a multi-participant video application;
    processor for determining a data stream ranking associated with at least one of the plurality of data streams; and
    processor for selectively controlling the representation of at least one of the plurality of the data streams at the client in dependence on the data stream ranking;

wherein the data stream ranking is dependent on at least one of the following factors:
the position of the representation in the virtual environment with respect to a virtual viewpoint;
the orientation of the representation in the virtual environment with respect to a virtual viewpoint;
the visibility of the representation in the virtual environment; and
the prediction state of the representation in the virtual environment.

10. An apparatus according to claim 9 wherein the data streams are associated with participants in a multi-participant application, wherein a first participant is associated with a first data stream and at least one further participant is associated with at least one further data stream, and wherein the transmitter transmits the at least one further data stream to a client associated with the first participant.

11. An apparatus according to claim 9 wherein the receiver receives notification of data loss from at least one data stream over the communications network, wherein the processor selectively controls the representation of the data streams by selectively reducing data content on at least one data stream in dependence on the data stream ranking.

12. An apparatus according to claim 9 wherein the processor controls the content of the data stream to change the representation of the participant rendered in the virtual environment, and wherein controlling the representation of the data stream comprises at least one of:
controlling colour of the participant rendered in the virtual environment;
controlling physical appearance of the participant rendered in the virtual environment; and
controlling audio level of the representation of the participant rendered in the virtual environment.

13. An apparatus according to claim 11 wherein the reduced data content maintains the saliency of the representations in the virtual environment.

14. An apparatus according to claim 11 wherein the processor, after a predetermined time period, selectively increases data content on at least one data stream.

15. An apparatus according to claim 11 wherein the data content is reduced by at least one of spatial reduction, reducing the frame rate of the data and reducing the bitrate of the video data.

16. A method for maintaining saliency between rendered data streams in a data limited network, comprising the steps of:
transmitting at least one data stream across a communications network each data stream being suitable for rendering and being associated with a participant in a multiparty application;
receiving a data stream ranking associated with the at least one data stream, the data stream ranking being associated with the significance of the participant in the multiparty application;
receiving notification of received data from at least one of the transmitted data stream on the communications network;
adapting data in at least one data stream in dependence on the ranking associated with the at least one data stream; and
transmitting at least one adapted data stream;
wherein the data stream ranking of a data stream is dependent on at least one of the following factors:
the position of the representation in the virtual environment with respect to a virtual viewpoint;
the orientation of the representation in the virtual environment with respect to a virtual viewpoint;
the visibility of the representation in the virtual environment with respect to a virtual view point; and
the prediction state of the representation in the virtual environment.

* * * * *